United States Patent [19]
Ponte et al.

[11] Patent Number: 5,527,454
[45] Date of Patent: Jun. 18, 1996

[54] MECHANICAL VENTILATION SYSTEM TO CAPTURE GASES RELEASED FROM WASTEWATER PASSING THROUGH ROCK MEDIA TRICKLING FILTERS

[75] Inventors: Manuel Ponte, Piscataway; Joseph Lecompte, Rahway, both of N.J.

[73] Assignee: Jacobs Environmental, Inc., Piscataway, N.J.

[21] Appl. No.: 233,824

[22] Filed: Apr. 26, 1994

[51] Int. Cl.$^6$ ........................................ C02F 3/04
[52] U.S. Cl. ........................ 210/151; 210/188; 210/293
[58] Field of Search ................... 210/136, 150, 210/151, 188, 218, 266, 293, 520, 616–618; 261/DIG. 70, DIG. 71

[56] References Cited

U.S. PATENT DOCUMENTS

| | | | |
|---|---|---|---|
| 3,113,100 | 12/1963 | Moore | 210/520 |
| 3,827,559 | 8/1974 | Gass et al. | 210/150 |
| 4,035,296 | 7/1977 | Armstrong | 210/151 |
| 4,202,774 | 5/1980 | Kos | 210/293 |
| 4,925,552 | 5/1990 | Bateson et al. | 210/150 |
| 5,160,614 | 11/1992 | Brown | 210/293 |
| 5,234,581 | 8/1993 | Rosenberg | 210/151 |

*Primary Examiner*—Thomas G. Wyse
*Attorney, Agent, or Firm*—Ezra Sutton

[57] ABSTRACT

A trickling filter for treating and purifying wastewater, including a bed of filter media adapted to receive and support aerobic bacteria for reacting with the wastewater, and rotating radial areas for distributing the wastewater over the surface face area of the bed of filter media. Drainage blocks for collecting treated wastewater and reacted air are disposed below the bed of filter media collection channels for collecting air and treated wastewater from the drainage blocks. Air-discharge ducts are connected to the collection channels for discharging the reacted air to a scrubber, and water-discharge ducts are connected to the collection channels for discharging the treated wastewater from the filter. Fans create a negative air-pressure flow through the filter media collection channels, vent pipes, and the air-discharge ducts to draw the reacted air to a scrubber for filtering the reacted air.

23 Claims, 6 Drawing Sheets

MECHANICAL VENTILATION SYSTEM TO CAPTURE GASES RELEASED FROM WASTEWATER PASSING THROUGH ROCK MEDIA TRICKLING FILTERS

FIELD OF THE INVENTION

The invention provides an innovative, effective, and economical means of capturing and treating gases released from wastewater as they travel down through a rock media trickling filter. The invention also provides an innovative and effective means of controlling the aeration of the wastewater as it trickles down through the rock, rather than by relying on natural draft to produce sufficient air movement through the rock media.

BACKGROUND OF THE INVENTION

A trickling filter is a biochemical wastewater treatment process, which relies on microorganisms growing in the surface film on the rock media to assimilate the biodegradable organic substances in the wastewater as it trickles down. Having an adequate supply of fresh air in the void spaces within the rock media is of critical importance to its successful operation.

During the operation of the filter, microorganisms, which are naturally present in the wastewater, establish a gelatinous microbial film on the surface of the media. As the wastewater trickles down past the microbial mass, the microorganisms consume the biodegradable organic matter, thus purifying the wastewater. As the microorganisms grow and multiply, the microbial film thickens and sloughs off the surface of the media. Part of the microbial film is constantly being carried out of the filter by the wastewater. The microbial population established on the surface of the media requires oxygen to thrive and to provide their wastewater purification functions. If there is insufficient air flow through the filter media, the treatment performance decreases, and odorous conditions develop.

Traditionally, the only means of providing oxygenated fresh air has been by air circulation due to natural draft; i.e., air movement caused by the temperature differential between the wastewater and the ambient air. When the wastewater is warmer than the ambient air, the wastewater warms the air, causing it to rise through the rock media and to the atmosphere. When the wastewater is cooler than the ambient air, the wastewater cools the air, causing it to travel downwards through the rock media and out of the filter through vents, access shafts, and the like. It has been estimated that in order for there to be adequate air movement through trickling filter rock media, the temperature difference between the ambient air and the wastewater must be in the order of 10° F. to 15° F. Without adequate air movement, the oxygen transfer from the air to the wastewater is not sufficient to maintain the aerobic conditions required by the microbial population growing on the surface of the rock. As a result, anaerobic conditions are created in the filter, the wastewater treatment performance is adversely affected, and odorous gases are produced. Eventually when the relative temperatures of the ambient air and the wastewater become conducive to higher air movement through the filter media, the odorous gases accumulated are released to the atmosphere, creating the potential for odor complaints from the surrounding community and penalties from the regulatory agencies.

In some instances, odor-laden gases from rock media trickling filters have been captured by covering the filter with a dome and withdrawing the gases from under the dome by suction. The gases can then be exhausted to the atmosphere directly or after treatment with odor-control equipment. If there are places for fresh air to enter the filter underdrain, so it can flow upwards through the rock media, this method should enhance the aeration of the wastewater.

Another method, which has been conceived to improve the aeration of the wastewater involves covering the filter with a dome and forcing air into the dome, so it flows through the filter media and filter underdrain, and is exhausted to the atmosphere through the filter effluent channel or pipe, filter vents, and the like. However, this method has the drawback of not providing for readily capturing the gases for subsequent odor-control treatment.

Conventional filters cannot always provide sufficient aeration of the wastewater, since air flow through the filter is dependent on atmospheric conditions, which are beyond the control of the filter operator. As a result, conventional filters typically release gases of an obnoxious character, which create nuisance odor conditions in the surrounding areas.

Prior patents in this field have also failed to provide satisfactory results. For example, U.S. Pat. No. 3,275,147 shows a system for a trickling filter where there is a plastic dome covering the filter bed and a blower is used to produce pressurized air which is forced down through the filter media bed to produce wet scrubbing of the odor-laden air over the entire bed of filter material. However, this patent does not provide a downward air flow caused by a negative air pressure to insure that odorous gases are not created and sent into the atmosphere. The following prior art patents also do not have downward air flow caused by a negative air pressure in regard to trickling filters:

U.S. Pat. Nos.: 947,333

2,200,581

3,126,333

3,853,752

3,966,599

4,631,183

5,030,353

It is an object of the present invention to provide a trickling filter system which positively insures that a downward air flow through a filter media bed is created by a negative air pressure apparatus which insures that malodorous gases are not created and sent into the atmosphere.

Another object of the present invention is that it provides a downward flow of air through the filter media bed and thereby provides a sufficient and continuous supply of oxygen to maintain the necessary aerobic conditions for the microorganisms to grow and biodegrade the organic matter in the waste water treated in said trickling filter.

A further object of the present invention is to provide a scrubber system in cooperation with the trickling filter, so that the reacted air exiting from the filter media and ventilation systems are directed to the scrubber system to remove any remaining noxious or malodorous gases before said reacted air is released to the atmosphere.

SUMMARY OF THE INVENTION

This invention provides for aeration of the wastewater and allows capturing of the gases without the need for a filter cover or dome. This is accomplished by creating a negative pressure within the filter by utilizing one or more fans connected to the filter underdrain. The invention, by inducing a downward flow of atmospheric air through the rock media and through the air space above the liquid in the filter underdrain and effluent channel, provides positive control of the ventilation rate. The invention also enables collection and transfer of the gases, so they may be deodorized by a gas scrubber. The suction from the fans can be connected directly to the underdrain space, or indirectly, via the filter effluent collection channels, access manways, vent pipes, and the like, depending on the particular filter configuration. The present invention can be incorporated in the design of new trickling filters or retrofitted on existing trickling filters.

With the foregoing in mind, the object of this invention is to provide a highly effective system for improving the operation of a rock media trickling filter by maintaining aerobic conditions within the filter and thus reducing the formation of obnoxious odors, as well as to provide the means to capture the off-gases for deodorization, if desired, by an odor-control system, such as a scrubber, biofilter, activated carbon, etc. This is more clearly explained by the following description and accompanying drawings.

BRIEF DESCRIPTION OF THE DRAWINGS

Further objects, features, and advantages of the present invention will become apparent upon consideration of the detailed description of the presently-preferred embodiment, when taken in conjunction with the accompanying drawings, wherein.

DETAILED DISCUSSION OF THE PREFERRED EMBODIMENT OF THE INVENTION

FIGS. 1 through 4 depict a trickling filter 10 for treating wastewater in accordance with the present invention. Even though the invention is shown and described in connection with a particular rock media trickling filter design, it is to be understood that it has application to other types of filters.

Figure 1:
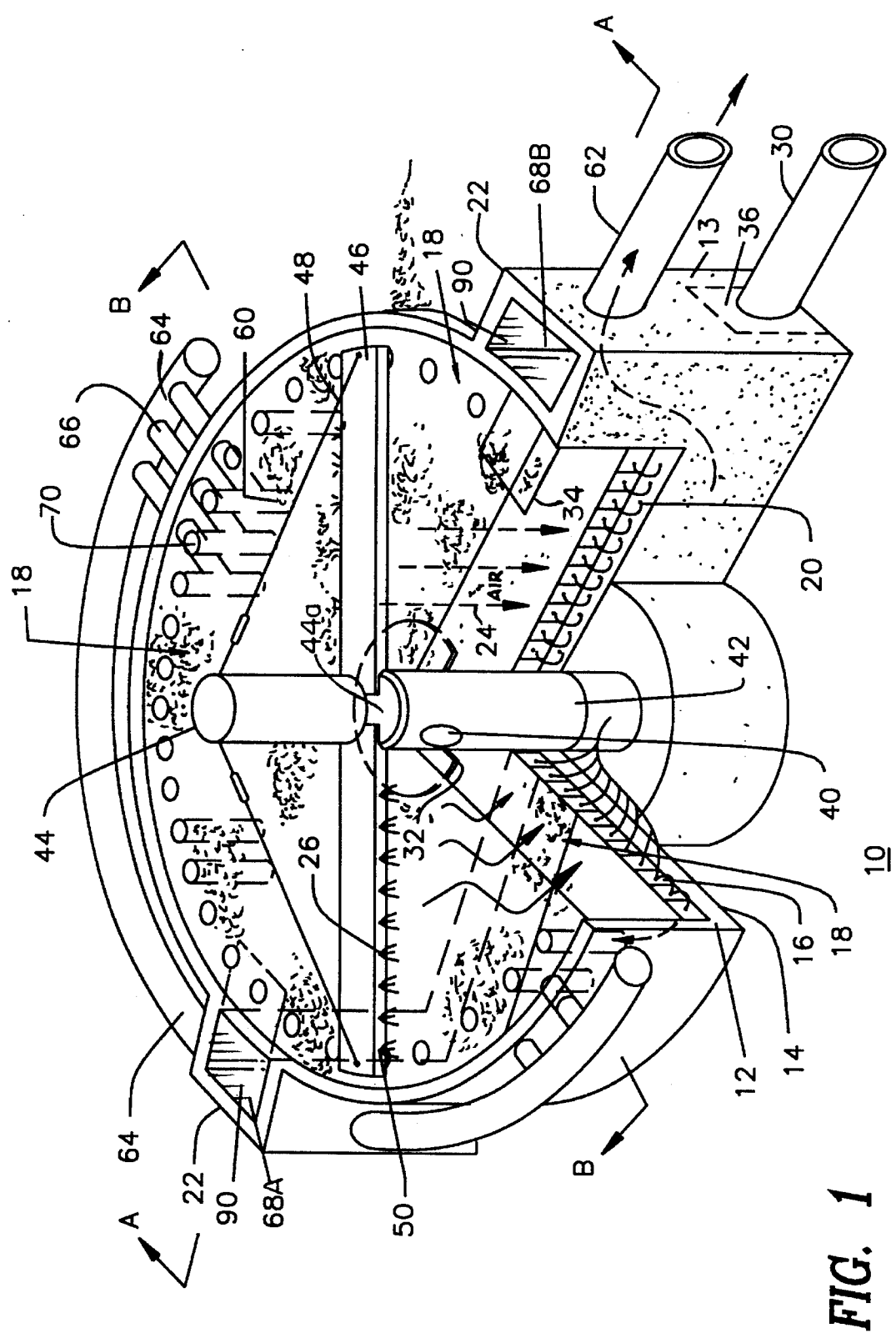
FIG. 1 is a perspective view of the present invention, primarily illustrating the flow of wastewater and reacted air through the trickling filter apparatus.
Figure 2:
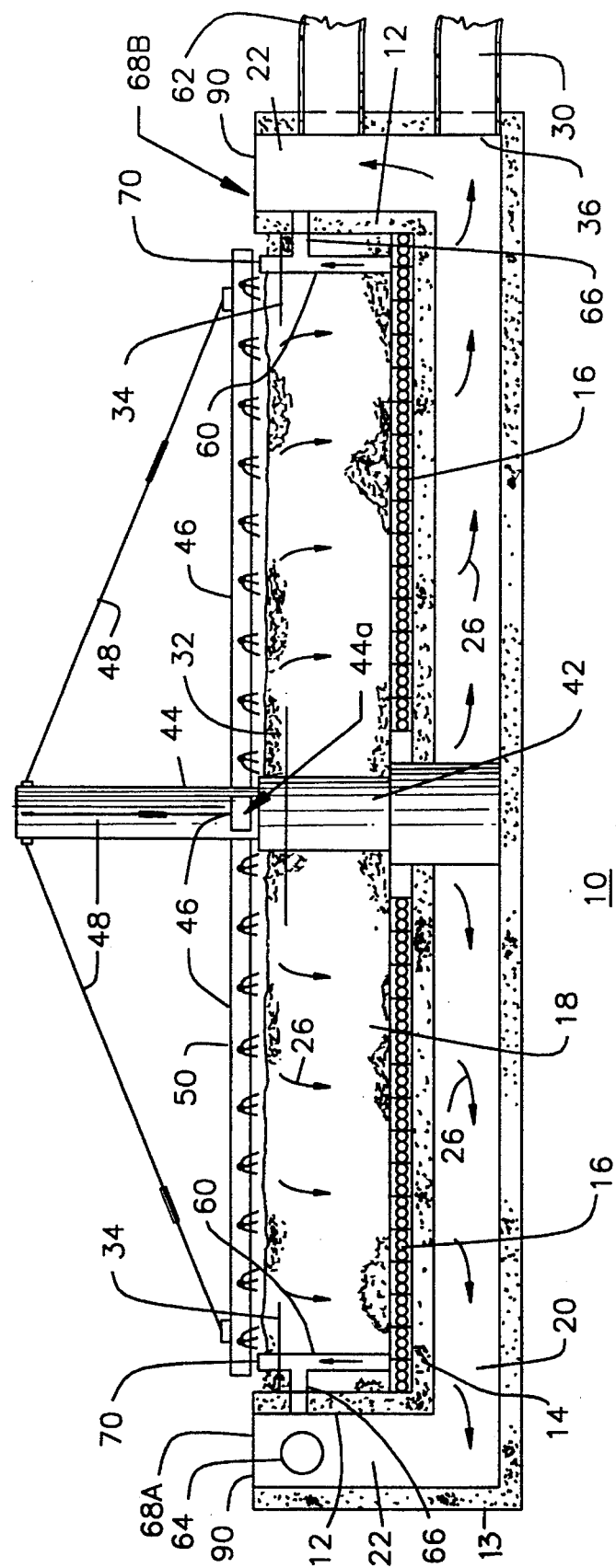
FIG. 2 is a cross-sectional view of the present invention, shown along an A—A axis line, displaying all component sections of the trickling filter apparatus for that view.
Figure 3:
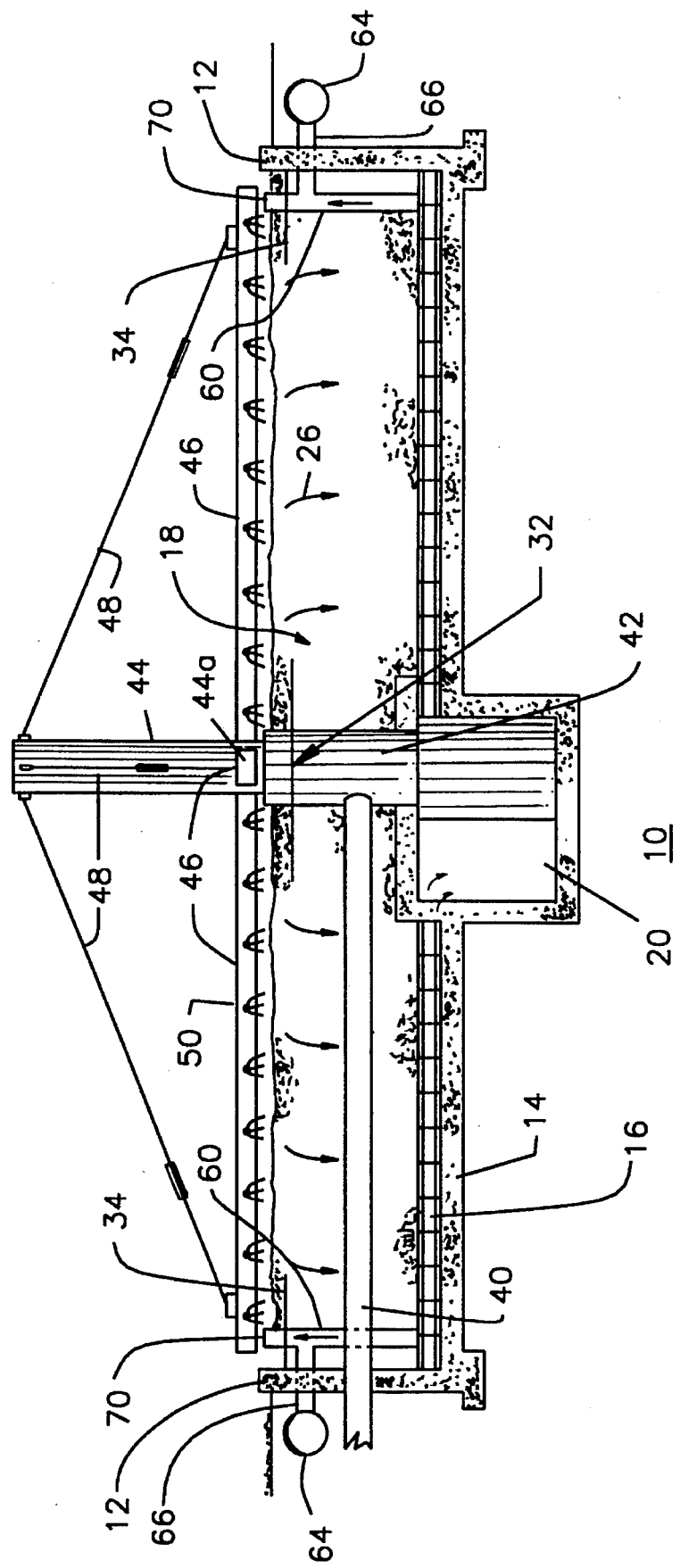
FIG. 3 is a cross-sectional view of the present invention, shown along the B—B axis line, displaying all component sections of the trickling filter apparatus for that view.
Figure 4:
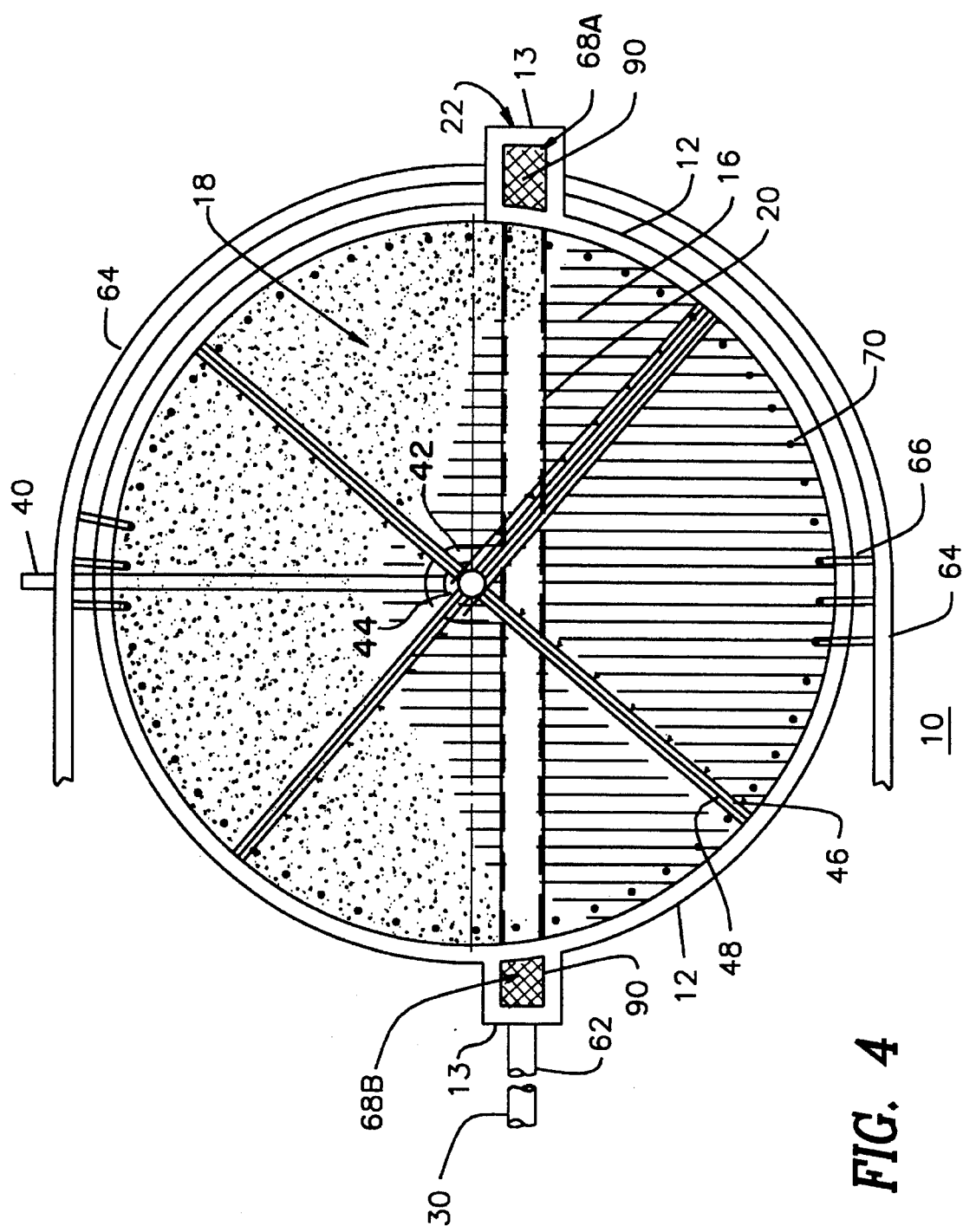
FIG. 4 is a top view of the present invention, primarily illustrating the flow and distribution of wastewater to the surface area of the filter media.

The trickling filter 10 comprises an upstanding outer circular wall 12 and horizontal base 14, preferably made of concrete. The base 14 supports a plurality of drain blocks 16, either hollow or of inverted U-shaped cross section, laid on the surface of base 14 and abutting with one another. The filter media 18, which can consist of several feet of either gravel, rock, discrete plastic shapes, or assembled plastic shapes, is placed on top of drain blocks 16 to permit the wastewater 26 that trickles down through filter media 18 to enter the underdrain space within the drain blocks 16 and to flow towards one or more diametrically-located collection channels 20. As shown in FIG. 2, at both ends of the collection channels 20, there are vertical access manways 22, between walls 12 and 13, for filter maintenance purposes, which also provide ventilation of the filter channel and underdrain system. Although not shown, an overflow pipe or cutout in the filter wall 12 is provided, so that if the wastewater 26 does not pass through the filter fast enough, it will overflow to the access manways 22 and to the effluent pipe 30, rather than over the filter wall on to the ground.

Wastewater 26 is delivered to the filter through an influent pipe 40 connected to a hollow distributor pipe 42, which is located at the center of the bed of filter media. Mounted on the upper end of the distributor pipe 42 is a rotary distributor 44 having a central hub portion 44a and a plurality of radial arms 46 projecting from the hub portion, and supported circumferentially of the hub by means of a support structure 48. Each of the arms 46 has a plurality of small openings 50 suitably arranged, so the wastewater 26 is fed through the system unto the top of the filter media bed 18. The discharge of the wastewater 26 through the openings effects rotation of the rotary distributor 44 to distribute the wastewater 26 over the entire bed.

The present invention controls the air flow rate through the filter and captures the air that has come in contact with the wastewater 26, so that it can be treated as necessary. More particularly, the present invention creates a negative pressure within the filter 10, so that there is circulation of air 24 downwardly through the filter bed 18. This is accomplished by connecting two fans to a downstream manway 68B with a duct 62 and connecting two fans to an upstream manway 68A with a duct 64. Vent pipes 60 are connected to duct 64 via connection ducts 66 to ensure proper air circulation through the areas of the filter media 18 furthest from the collection channel. The upstream and downstream access manways 68A and 68B, as well as all the filter vent pipes 60, are capped at their tops 90 and 70 to prevent air from entering or exiting through them. As a result, atmospheric air flows through the media 18, the filter underdrain 16, the effluent channel 20, the vent pipes 60, and the manways 68A and 68B and into the induced draft fans 72 via ducts 62 and 64. The manways 68A and 68B and vents 60 serve as wastewater traps 22 to separately discharge the filtered wastewater 26 and the gas stream 24 from below the filter bed. The fans 72 can discharge the collected gases to an odor-control device 76, if necessary, or directly through a dispersion stack 78 to the atmosphere. Odor control may be necessary if the wastewater 26 contains odorous substances that are not readily stabilized by the microbial population of the filter or because of the proximity of receptors to the filter, which are sensitive to the musty odor, which is characteristic of well-operated trickling filters. Other types of gas treatment may be necessary if the wastewater 26 contains volatile toxic substances that are not readily stabilized by the microbial population of the filter or adsorbed by the surface film on the rock media. The availability of multiple-induced draft fans 72 permits varying the air flow 24 rate, depending on treatment process requirements and odor-control needs.

In order to minimize the short circuiting of the air flows 24 from the atmosphere to the collection channel 20, plastic or rubber, etc., liners 32 and 34 are installed within the rock filter media 18 at strategic locations. Two such locations for locating the plastic liner are the distributor pipe area 32 and the collection channel areas 34. In addition, a flapper valve 36 is installed at the downstream manhole 68B, in front of the effluent pipe 30, to minimize the air flow 24 from the processes located downstream of the filter, into the trickling filter ventilation system 28.

Figure 5:
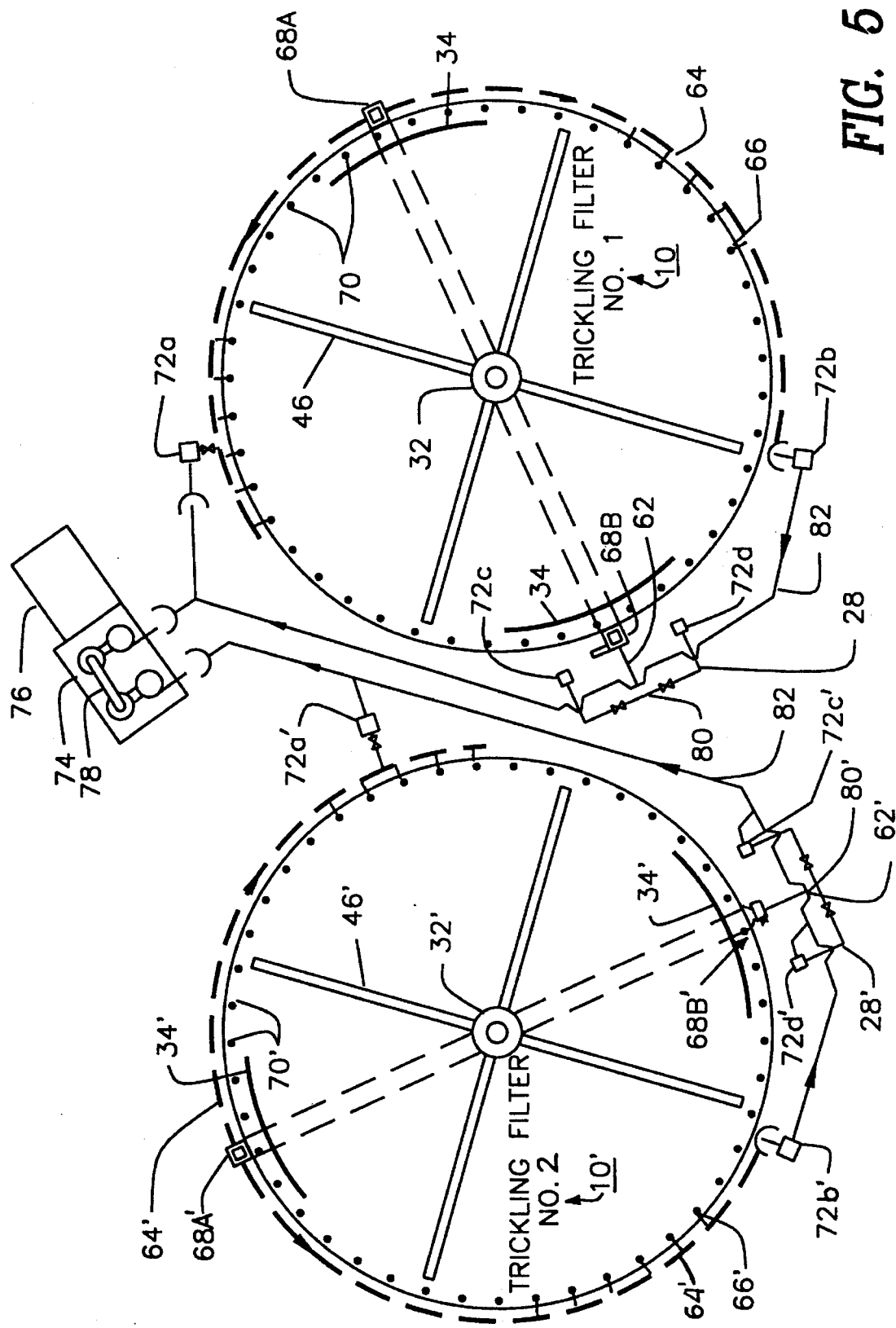
FIG. 5 is a top plan view of the present invention, illustrating the movement of the reacted air through the negative air pressure duct system by using multiple-induced draft fans.

FIG. 5 depicts two trickling filters 10 and 10' with appropriate vent duct piping 62 and 64, fans 72 for inducing a negative air pressure within the filter, discharge duct 82, and a gas-scrubbing system 74 for odor control of the reacted air, part of which is housed in an odor-control building 76. The induced draft fans 72a and 72b are pulling the reacted air through underground duct 64 from the upstream manway 68a. Concurrently, the induced draft fans 72c and 72d are pulling the reacted air through the downstream manway 68b via vent duct 62. This reacted air from vent duct 62 is then pulled through a manifold system 80 via an above-ground vent duct 82 to the gas-scrubbing system 74 for odor removal. Similarly, the reacted air from underground vent duct 64 is connected to the above-ground vent duct 82 via the induced draft fans 72a and 72b. The reacted air in duct 82 is transferred to the gas-scrubbing system 74 for odor removal.

OPERATION OF THE PRESENT INVENTION

In the operation of the trickling filter 10, wastewater influent 26 is pumped through the horizontal influent pipe 40 to the vertical hollow distributor pipe 42 where the wastewater influent 26 flows to the rotary distributor column 44. The rotary distributor column 44 then transfers the liquid wastewater influent 26 radially out through the plurality of radial arms 46 where the wastewater is discharged through a plurality of small openings 50. As the radial arms 46 rotate, the wastewater influent 26 is spread out over the filter media 18 in a circular fashion.

Figure 6:
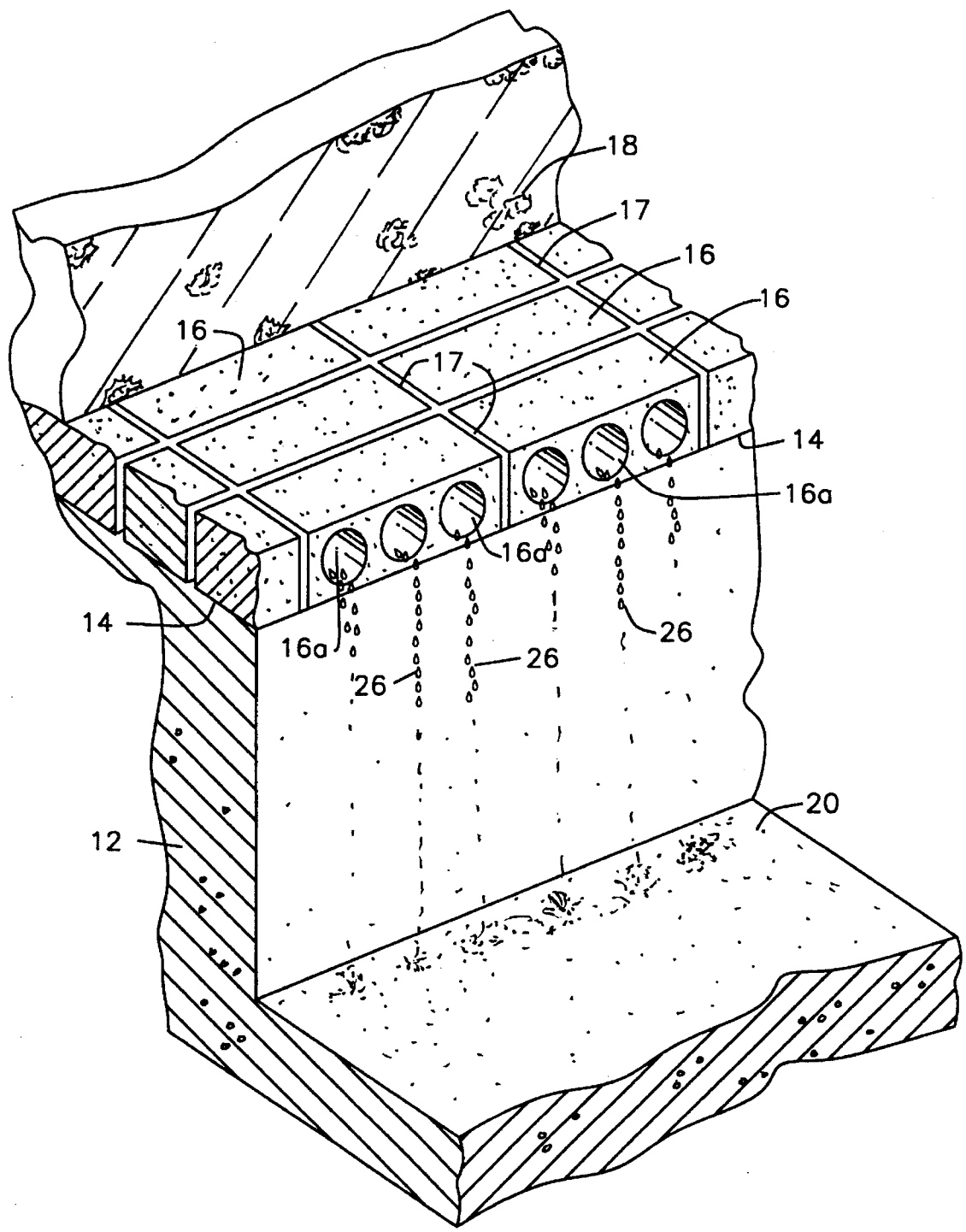
FIG. 6 is a perspective view of the drain blocks and the flow of wastewater through them.

The liquid wastewater 26 then trickles through several feet of filter media 18 where the microorganisms in the filter media 18 consume the biodegradable organic matter, thus purifying the influent wastewater. The reacted wastewater reaches the top of drain blocks 16 and passes through the adjoining spaces 17 between drain blocks 16 located below the filter bed 18. The liquid effluent then enters the underdrain space 16a within the drain blocks 16, as shown in FIG. 6. This effluent wastewater 26 then flows radially outward through one or more diametrically-located collection channels 20, which are formed by a continuation of the concrete base 14 of the trickling filter 10. The effluent wastewater 26 from collection channels 20 is then discharged through effluent pipe 30. The effluent wastewater 26 is then treated further and can then be discharged on to the land or into a body of water, such as a stream, river, lake, and/or ocean for public use.

In order to provide air circulation of the filter from the bottom of the filter bed, vent pipes 60 are located along the perimeter of the filter 10 and connect to the filter media 18 at the base of the filter bed and then to the vent duct 64 through connection ducts 66 constructed through the trickling filter outer circular duct wall 12.

For biodegradation of organic matter to take place, draft fans 72 draw atmospheric air 24 through the filter media bed 18, the filter underdrain blocks 16, the effluent channels 20, the effluent pipe 30, the vent pipes 60, and the manways 68A and 68B through draft fans 72 to a scrubber system 74. Draft fans 72 create this negative pressure.

ADVANTAGES OF THE PRESENT INVENTION

The main advantage of the present invention is the creation of a negative pressure within the trickling filter 10, so that there is circulation of air flow 24 downwardly through the filer media bed 18.

Another advantage of the present invention is that the manways 68A and 68B and pipe vents 60 serve as wastewater traps to separately discharge the excess filter effluent wastewater from below the media filter bed 18.

Another advantage of the present invention is that the manways 68A and 68B duct system and pipe vents 60 serve as excess gas stream traps from below the filter media bed 18, whereby draft fans 72 discharge these excess collected gases to be deodorized with scrubber system 74, if necessary, or directly through a dispersion stack 78 to the atmosphere.

Still another advantage of the present invention is the minimization and short circuiting of air flows 24 from the atmosphere to the collection channels 20, by providing plastic liners 32 and 34 which are installed within the filter media bed 18 at strategic locations. These plastic liners 32 and 34 divert air flow 24 away from the rotary distributor column 44 and at the periphery of trickling filter 10 near the pipe vents 60 so that the air flow 24 is concentrated in the filter media bed 18 area between said center column 44 and pipe vents 60.

Another advantage of the present invention is the installation of a flapper valve which minimizes the air flow 24 going into the effluent pipe 30, thus properly directs said air flow 24 into the trickling filter ventilation system 28, described herein.

Lastly, another advantage of the present invention is a manifold system 80 for the pulling through of reacted air from the vent duct 62 and 64 systems via an above ground vent duct 82 to a gas-scrubbing system 74 for odor removal of foul smelling gases.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A trickling filter for treating and purifying wastewater, comprising:

a) a bed of filter media adapted to receive aerobic bacteria for reacting with the wastewater;

b) means for supplying wastewater to said filter and distributing the wastewater over the surface face area of said bed of filter media;

c) drainage means for collecting treated wastewater and reacted air being disposed below said bed of filter media;

d) collection means for collecting said treated wastewater and reacted air from said drainage means;

e) air-discharge means connected to said collection means for discharging said reacted air to the atmosphere through air-treatment means;

f) water-discharge means connected to said collection means for discharging said treated wastewater from said filter;

g) means for creating a negative air-pressure flow through said collection means and said air-discharge means to draw said reacted air to said air-treatment means; and h) said air-treatment means for filtering said reacted air.

2. A trickling filter in accordance with claim 1, wherein said bed of filter media is gravel, rock, sand, charcoal, glass beads, seashells, discrete plastic shapes, or assembled plastic shapes.

3. A trickling filter in accordance with claim 1, wherein said means for supplying wastewater to said filter media includes a plurality of rotating radial members connected to a central hub and having wastewater supply openings formed therein.

4. A trickling filter in accordance with claim 1, wherein said drainage means includes a plurality of drain blocks for receiving wastewater from said filter media.

5. A trickling filter in accordance with claim 1, wherein said collection means are disposed below said drainage means and include collection channels connected to access manways.

6. A trickling filter in accordance with claim 5, wherein said air-discharge means includes ducts connected to said access manways.

7. A trickling filter in accordance with claim 1, wherein said water-discharge means includes an effluent pipe.

8. A trickling filter in accordance with claim 1, wherein said means for creating a negative air pressure flow through the bed of filter media includes multiple-induced draft fans.

9. A trickling filter in accordance with claim 1, wherein said means for supplying wastewater to the surface of said bed of filter media includes an influent pipe connected to a hollow distributor pipe, located at the center of said bed of filter media.

10. A trickling filter in accordance with claim 9, wherein said hollow distributor pipe is a rotary distributor hub, which is mounted on the upper end of said hollow distributor pipe.

11. A trickling filter in accordance with claim 10, wherein said rotary distributor hub has a central hub and a plurality of radial arms projecting from said central hub and these plurality of radial arms are supported circumferentially of the hub by means of a support structure.

12. A trickling filter in accordance with claim 11, wherein said plurality of radial arms has a plurality of small openings suitably arranged, so the wastewater is fed through the distribution system onto the surface area of the filter media bed.

13. A trickling filter in accordance with claim 5, wherein said drainage means are drain blocks to permit the wastewater to enter the underdrain space within the drain blocks and to flow towards one or more of said collection channels.

14. A trickling filter in accordance with claim 13, wherein said collection channels are connected to access manways for filter maintenance purposes and said access manways provide ventilation of said collection channels and underdrain system of said reacted air.

15. A trickling filter in accordance with claim 14, further including overflow means for said wastewater.

16. A trickling filter in accordance with claim 1, wherein said treated wastewater is discharged through effluent channels and upstream and downstream manways to a final wastewater clarification apparatus.

17. A trickling filter in accordance with claim 16, further including fans for pulling reacted air through the upstream and downstream manways via vent ducts.

18. A trickling filter in accordance with claim 1, wherein an underground vent duct is connected to an above-ground vent duct, so that said reacted air in the duct-manifold system is transferred to said air-treatment means for odor removal.

19. A trickling filter in accordance with claim 5, further including means for minimizing the short circuiting of the air flow caused by the negative air pressure from the atmosphere to said collection channels.

20. A trickling filter in accordance with claim 9, further including a plastic liner located at said distributor pipe and at the perimeter of the filter over a vent pipe channel.

21. A trickling filter in accordance with claim 1, further including a flapper valve disposed at a downstream manhole access channel and in front of an effluent pipe to minimize the air flow from the trickling filter.

22. A trickling filter in accordance with claim 1, wherein said air-treatment means removes volatile substances in said reacted air and is a fine-mist scrubber, a packed tower scrubber, a biofilter, a bioscrubber, an activated carbon adsorber, or a fume incinerator.

23. A trickling filter in accordance with claim 1, wherein said air-discharge means includes vent pipes connected to a duct by connection ducts.

* * * * *